United States Patent Office 3,141,237
Patented July 21, 1964

3,141,237
WELDING NODULAR IRON
William A. Moore, Livonia, Mich., assignor to Ford
  Motor Company, Dearborn, Mich., a corporation of
  Delaware
No Drawing. Filed Oct. 29, 1962, Ser. No. 233,937
        1 Claim.  (Cl. 29—495)

This invention relates to a process of welding nodular iron and gray iron and to a welding rod and flux usable in this operation. The object of this invention is to provide a system for welding gray iron and nodular iron castings in such a manner that the weld is substantially nodular iron with all of the desirable properties associated with this metal. Such a process is highly desirable in the repair of nodular iron and gray iron castings.

The technology of producing and repairing gray iron castings is well understood and will not be further described. The technology of nodular cast iron is of rather recent origin. A scholarly treatise on this subject will be found in the American Society for Metals Metal Handbook, 1954, supplement pages 49–52.

The welding procedure comprising this invention involves the use of a rod which is essentially a typical nodular iron composition. A suitable composition for such a rod follows:

|  | Percent |
|---|---|
| Carbon | 3.95 |
| Manganese | 0.54 |
| Silicon | 2.80 |
| Magnesium | 0.044 |

The remainder is made of iron and incidental impurities.

The following flux composition has been found particularly adaptable to yield a weld deposit in which the weld is predominantly nodular:

|  | Percent |
|---|---|
| Boric acid | 38 |
| Sodium carbonate | 40 |
| Ammonium sulfate | 2 |
| Powdered iron | 15 |
| Magnesium chloride | 5 |

The article to be welded is usually preheated by a gas burner and the same gas burner is then employed to melt the nodular iron rod in the presence of the flux described above. Photomicrographs of weldings so produced indicate a nodularity in excess of 90 percent.

I claim as my invention:

The process of gas welding a ferrous article which has been produced from a metal selected from the group consisting of gray iron and nodular iron consisting of gas melting a ferrous rod produced from a nodular iron composition in the presence of a flux consisting of boric acid 38%, soda ash 40%, ammonium sulphate 2%, powdered iron 15%, and magnesium chloride 5%, and applying the molten metal so produced to the ferrous article.

References Cited in the file of this patent
UNITED STATES PATENTS

| 1,283,909 | Roberts | Nov. 5, 1918 |
| 2,987,808 | Benham | June 13, 1951 |